United States Patent
Abele et al.

(10) Patent No.: US 6,422,336 B1
(45) Date of Patent: Jul. 23, 2002

(54) ELECTRICALLY ASSISTED POWER STEERING SYSTEM FOR MOTOR VEHICLES

(75) Inventors: Wolfgang Abele, Spraitbach; Peter Brenner, Moegglingen; Martin Budaker, Heubach; Willi Nagel, Remseck; Klaus Noder, Duerlangen, all of (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 09/720,603

(22) PCT Filed: Jun. 19, 1999

(86) PCT No.: PCT/EP99/04279
§ 371 (c)(1),
(2), (4) Date: Mar. 5, 2001

(87) PCT Pub. No.: WO00/00377
PCT Pub. Date: Jan. 6, 2000

(30) Foreign Application Priority Data

Jun. 26, 1998 (DE) .......................................... 198 28 513

(51) Int. Cl.[7] .................................................. B62D 5/04
(52) U.S. Cl. ...................................................... 180/446
(58) Field of Search ................................. 180/443, 444, 180/445, 446

(56) References Cited

U.S. PATENT DOCUMENTS

| | | | | | |
|---|---|---|---|---|---|
| 4,530,413 A | * | 7/1985 | Buike et al. | ................ | 180/404 |
| 4,715,461 A | * | 12/1987 | Shimizu | ...................... | 180/446 |
| 4,804,057 A | * | 2/1989 | Saeed | ......................... | 180/444 |
| 6,175,231 B1 | * | 1/2001 | Budaker et al. | ............ | 180/444 |
| 6,250,420 B1 | * | 6/2001 | Brenner et al. | ............. | 180/443 |

FOREIGN PATENT DOCUMENTS

| | | | | | |
|---|---|---|---|---|---|
| DE | | 3821083 A | * | 1/1989 | ............ B62D/5/04 |
| EP | | 726452 A2 | * | 8/1996 | ............. G01L/3/10 |

* cited by examiner

Primary Examiner—Kevin Hurley
(74) Attorney, Agent, or Firm—Kenyon & Kenyon

(57) ABSTRACT

An electrically supported power steering system for motor vehicles includes an input shaft, which is mechanically linked to a steering wheel for transmitting a steering torque required for steering of wheels to be steered. An output element is mechanically linked to the wheels to be steered. An electric motor, through which a servo force can be applied directly or indirectly to the output element, is arranged on the power steering system. The input shaft and the output element are connected to one another via a torsion bar. A detection unit for detection of a torque acting on the input shaft and of other steering-specific parameters includes a single pulse generator designed as a magnet ring and at least one magnetoresistive sensor.

11 Claims, 4 Drawing Sheets

SECTION A-A

ELECTRICALLY ASSISTED POWER STEERING SYSTEM FOR MOTOR VEHICLES

FIELD OF THE INVENTION

The present invention relates to an electrically supported power steering system for motor vehicles. The power steering system includes an input shaft mechanically linked to a steering wheel and used to transmit a torque required for the steering of wheels to be steered. An output element is mechanically linked to the wheels. A servo motor through which servo power can be applied directly or indirectly to the output element is arranged on the power steering system. The input shaft and the output element are connected to one another via a rotation-elastic element so that a limited torsion movement is possible between the input shaft and the output element. A contactless detection unit is used for contactless detection of the direction and intensity of a steering torque acting on the input shaft and of other steering-specific parameters. The detection unit includes at least one sensor respectively connected to the input shaft or the output element.

BACKGROUND INFORMATION

Such a power steering system is described, for example, in German Published Patent Application No. 38 44 578. In this power steering system, two drums made of non-magnetic material are respectively connected to an input shaft or an output element. The drums are provided with magnetizable media on their periphery or on an end face, so that they form alternating magnetic north and south poles. By measuring the difference in the rotation angles of the two drums, the torque is determined using magnetoresistive elements.

The servo support of an electric steering system can be controlled by detecting the torque. If the servo support of an electric steering system is controlled only as a function of the torque, this is perceived as unusual in a driving operation, because the friction conditions in that case are different from those of a hydraulically supported power steering system. There is no "feedback" of the steering rate from the steering torque. In order to compensate for this disadvantage, the steering rate must be detected. In order to detect the steering rate, an additional sensor is provided in conventional electric steering systems, for example, in German Published Patent 37 11 854. This sensor has a DC tacho-generator, for example, which generates a direct current having a voltage adjusted to the steering rate. Such a steering rate sensor involves a relatively high cost for detecting the steering rate.

SUMMARY

It is an object of the present invention to improve the control of an electrically supported power steering system. In particular, it should allow steering-specific parameters to be detected inexpensively and in a simple manner.

The above and other beneficial objects of the present invention are achieved providing a power steering system in which a detection unit of the generic power steering system contains a single pulse generator designed as a magnet ring, which is provided with alternating magnetic north and south poles on its peripheral surface or on its end face, so that both the relative position of the input shaft and the output element with respect to one another, as well as the change in the position of the input shaft, are detected via allocated sensors.

This design results in low assembly costs. In addition, the manufacturing costs of the steering system are reduced due to the small number of components.

Thus, the electrical connection between rotating parts of the sensors and a stationary sensor housing can be established via a flat spiral spring. This allows the signals to be transmitted in a simple and reliable manner.

Instead of a flat spiral spring, a wiper unit may also be used for the electrical connection between rotating parts of the sensors and a stationary sensor housing.

In order to also be able to detect the absolute steering angle in a simple manner, a gear, through which a plurality of revolutions of the input shaft or of the output element can be converted into small rotation or translation movements, is arranged on the output element. The gear contains a thread connected to the output element or the input shaft and a threaded nut, the threaded nut being guided by an axial guide in an axially movable but non-rotatable manner. In addition, the threaded nut is connected to a magnet that generates a signal with its axial movement for the absolute steering angle.

Using such a gear, a magnetoresistive sensor, which is used for detecting steering-specific parameters such as steering angle, steering rate, and steering acceleration, and another magnetoresistive sensor, which is used for detecting the absolute steering angle, are arranged on a common circuit board and work together with a common electronic unit.

The sensor units for detecting the steering-specific parameters torque, steering direction, steering angle, absolute steering angle, steering rate, and steering acceleration may be combined in a single unit. This in turn results in low assembly costs.

When using an electric motor as a servo motor, the measured parameters may be used for controlling the motor speed in a simple manner, resulting in better control quality.

DETAILED DESCRIPTION

Figure 1:
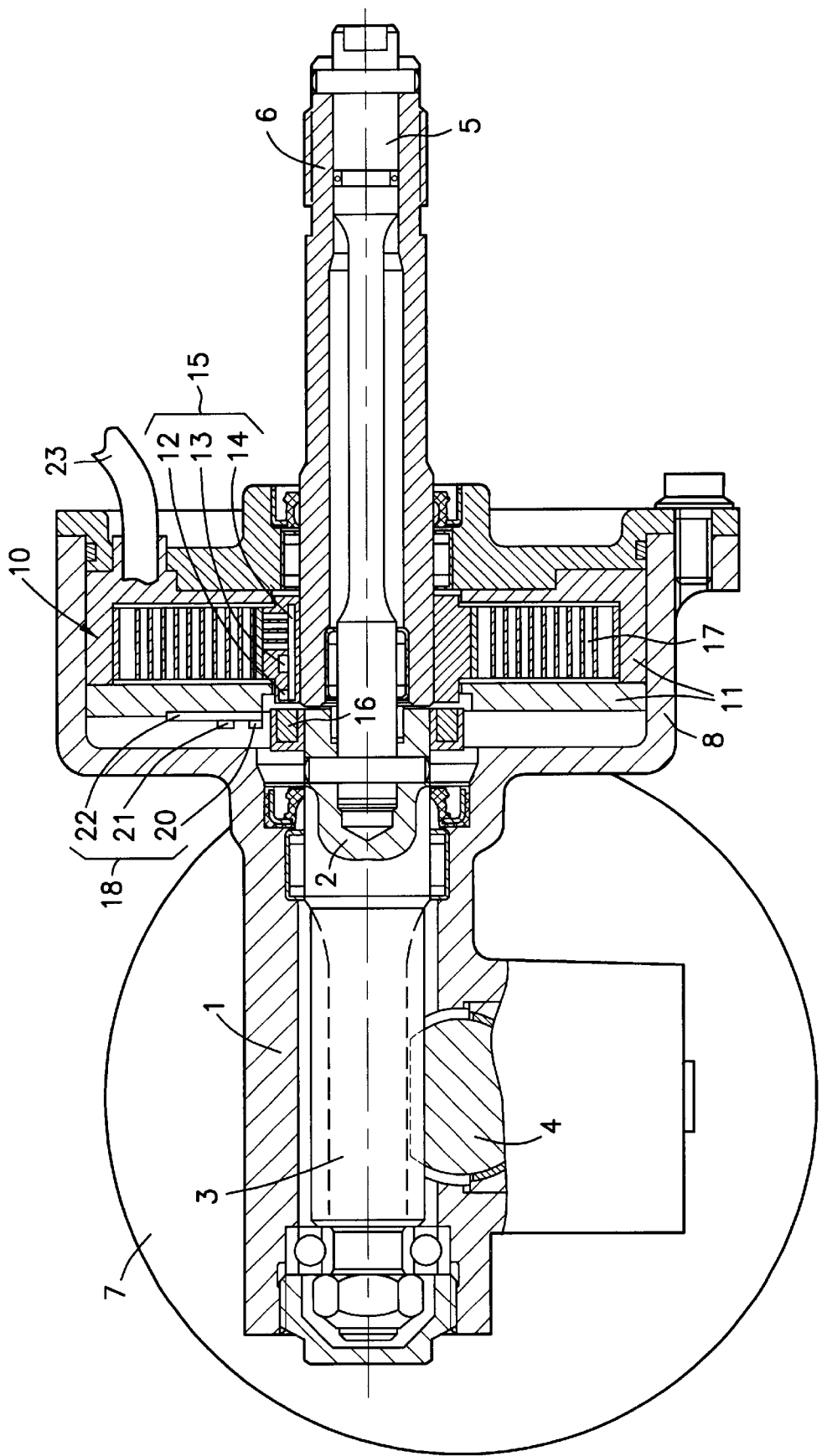
FIG. 1 is a cross-sectional view of a first embodiment of a power steering system according to the present invention.

The present invention is described with reference to the example of a power steering system having a rack-and-pinion gear. The invention may, however, also be used with other power steering systems to the same effect such as, for example, systems having ball-and-nut gears or systems where the servo unit is arranged in the steering column.

A pinion 3 connected to a pinion shaft 2 is rotatably mounted in a steering housing, identified hereinafter as housing 1. Pinion 3 represents an output element, which is mechanically linked to wheels to be steered (not illustrated) via a rack 4. In the case of a ball-and-nut steering system, a threaded spindle replaces pinion 3. Pinion shaft 2 is connected to an input shaft 6 of the steering gear via a torsion bar 5. As an alternative to torsion bar 5, another rotation-elastic element may be used.

Rack 4 is drivably connected to a servo motor designed as an electric motor 7 via a reduction gear (not illustrated). The servo motor may include a hydraulic motor.

In one part of housing 1, which is the upper part next to input shaft 6 in the example embodiment illustrated in FIG. 1, an enlargement 8 is formed to accommodate a detection unit 10.

Detection unit 10 contains a sensor housing 11 that includes a two-part design in this embodiment. A magnetoresistive sensor 12, referred to hereinafter as an MR sensor, having an electronic unit 13 on a circuit board 14, is mounted in sensor housing 11. MR sensor 12, electronic unit 13, and circuit board 14, together form a sensor unit 15 that rotates securely with input shaft 6.

A pulse generator in the form of a magnet ring 16 is arranged on a pinion shaft 2. Magnet ring 16 is provided on its peripheral surface or on its end face with alternating magnetic north and south poles. As an alternative to magnet ring 16, the pulse generator may be designed as a bar magnet. Magnet ring 16 works together with MR sensor 12.

A flat spiral spring 17 represents an electrical connection between stationary sensor housing 11 and rotating sensor unit 15. Flat spiral spring 17 is a flexible, coiled flat strip wire.

A torque applied to input shaft 6 produces a torsional angle between input shaft 6 and pinion shaft 2. This torsional angle is a measure of the torque and is measured by sensor unit 15. MR sensor 12 only measures in the area of a pole.

A second sensor unit 18, which is arranged on one end face of sensor housing 11, belongs to detection unit 10. Thus, sensor unit 18 is designed to be stationary. Sensor unit 18 contains an MR sensor 20 and an electronic unit 21, both mounted on a circuit board 22. Second sensor unit 18 is arranged so that its MR sensor 20 works together with the same magnet ring 16 as first MR sensor 12. Sensor unit 18 measures the movement of magnet ring 16 via a plurality of poles. The steering angle, the steering rate, and the steering acceleration may be derived from the measuring signal.

The two sensor units 15 and 18 deliver a measuring signal from which the respective steering direction may be derived. The two sensor units 15 and 18, together with flat spiral spring 17 and sensor housing 11, form detection unit 10 as a unitary component. Measuring signals may be forwarded from detection unit 10 to an electronic control unit (not illustrated) via a common cable 23.

Figure 2:
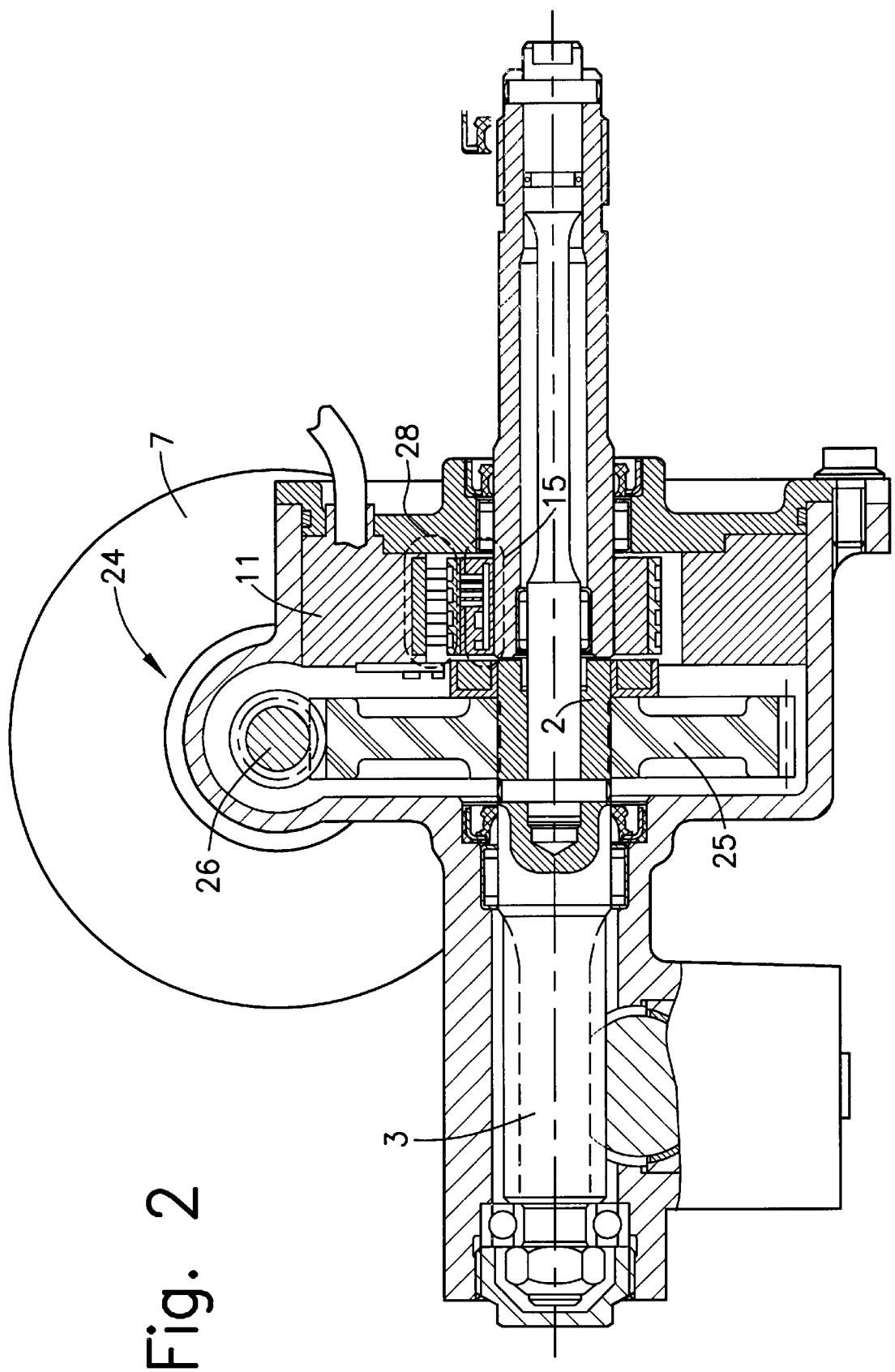
FIG. 2 is a cross-sectional view of a second embodiment of a power steering system according to the present invention.

In the example embodiment illustrated in FIG. 2, pinion shaft 2 having pinion 3 is drivably connected to electric motor 7 via a toothed gear or worm gear 24. A worm wheel 25 of worm gear 24 is mounted on pinion shaft 2. A worm 26, which is connected to an output shaft 27 of electric motor 7, works together with worm wheel 25.

In this example embodiment, a wiper unit 28 is used for the electrical connection between stationary sensor housing 11 and rotating servo unit 15 instead of flat spiral spring 17.

Neither the use of wiper unit 28 nor that of flat spiral spring 17 is bound to the position of electric motor 7. Therefore, both types of electrical connection may be used as alternatives in the embodiments illustrated in FIGS. 1 and 2.

The remaining components of the embodiment according to FIG. 2 substantially correspond to the parts of FIG. 1.

A third embodiment embodiment is explained with reference to FIGS. 3 and 4. A multiple magnet ring 30 is arranged on worm 26, i.e., output shaft 27 of electric motor 7. This magnet ring 30 works together with another MR sensor 31. MR sensor 31, together with an electronic unit 32 and a circuit board 33, forms a sensor unit 34. Magnet ring 30 must be positioned on worm 26 and MR sensor 31 must be positioned on circuit board 33 so that they are located at a precisely defined distance 35 from one another. Magnet ring 30 may be positioned on the opposite side of the gear engagement with worm 26, i.e., away from electric motor 7.

The main components of electric motor 7 are a rotor 36 and a stator 37. Stator 37 is secured to the housing; Rotor 36 is connected to output shaft 27 and therefore to worm 26. The rotor speed is measured via magnet ring 30. A mechanical connection exists between magnet ring 30 and pinion 3 via worm 26 and worm wheel 25 of worm gear 24. Thus, sensor unit 34 can measure the quantities steering angle, steering rate, and steering acceleration, in addition to the rotor speed. In this case, the resolution increases, because the transmission ratio of worm gear 24 multiplies the signals.

Input shaft 6 and pinion 2 are rotated more than 360° in normal steering operation, i.e., about two to four revolutions. Sensor units 18 and 34 cannot detect the absolute value of this angular range. Therefore a gear 38 is arranged on the output element of the power steering system, namely on pinion shaft 2, through which a plurality of revolutions of input shaft 6 and pinion shaft 2 may be converted into small rotational or translational movements. One embodiment of such a gear 38 is illustrated in FIG. 3. As illustrated in FIG. 3, a thread 40 is connected to pinion shaft 2 through which a corresponding threaded nut 41 performs a small translation movement when pinion shaft 2 is rotated. In the embodiment illustrated in FIG. 3, thread 40 is arranged on magnet ring 16, while threaded nut 41 carries a magnet 42. Thus, magnet 42 performs the same axial movement as threaded nut 41. This axial movement is detected by another MR sensor 43 and is a measure of the absolute steering angle. MR sensor 43, together with MR sensor 31, is mounted on circuit board 33. The two MR sensors 31 and 43 share electronic unit 32.

In order to prevent threaded nut 41 from rotating together with thread 40, threaded nut 41 is guided by an axial guide 44 in an axially movable but non-rotatable manner.

Figure 3:
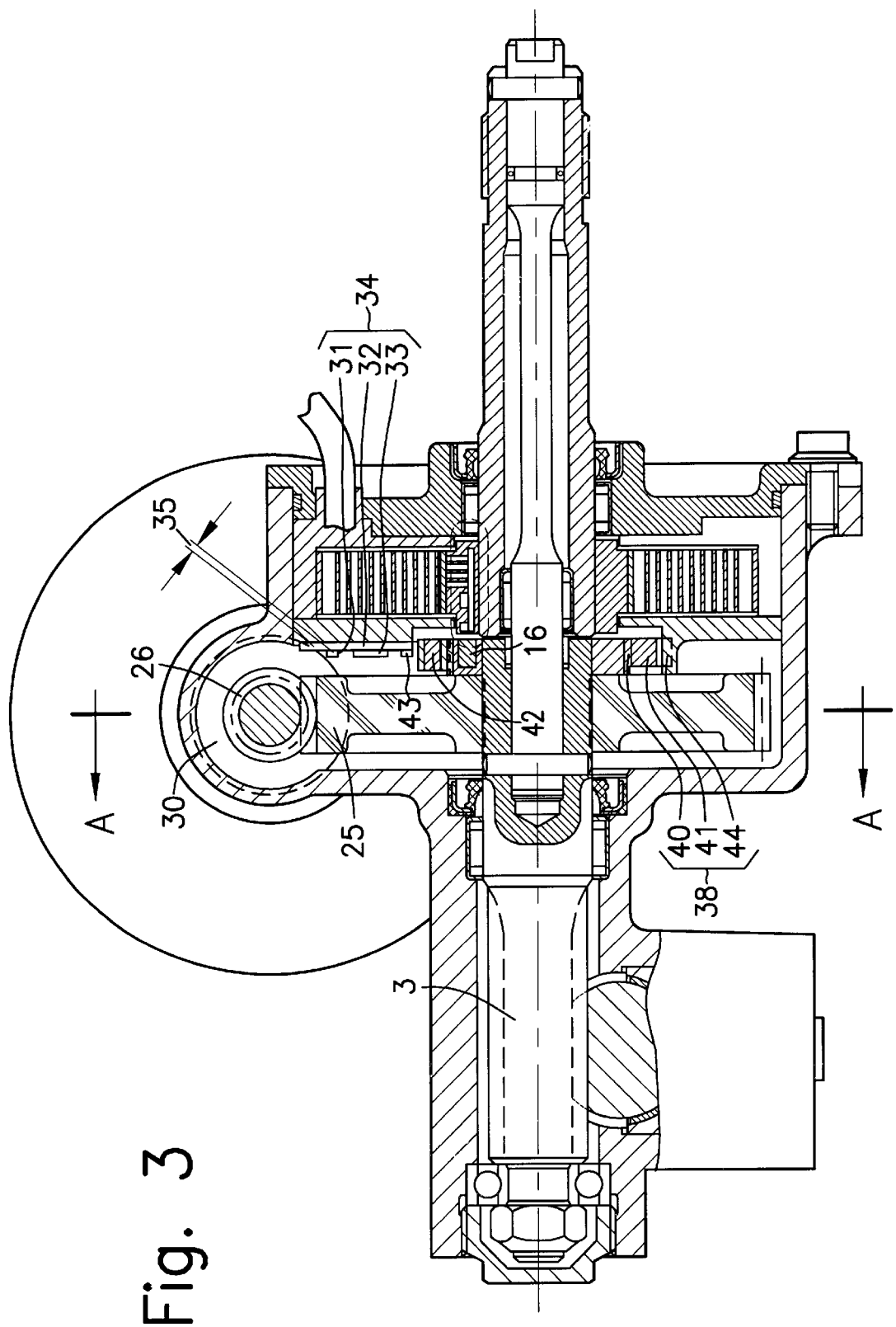
FIG. 3 is a cross-sectional view of a third embodiment of a power steering system according to the present invention.
Figure 4:
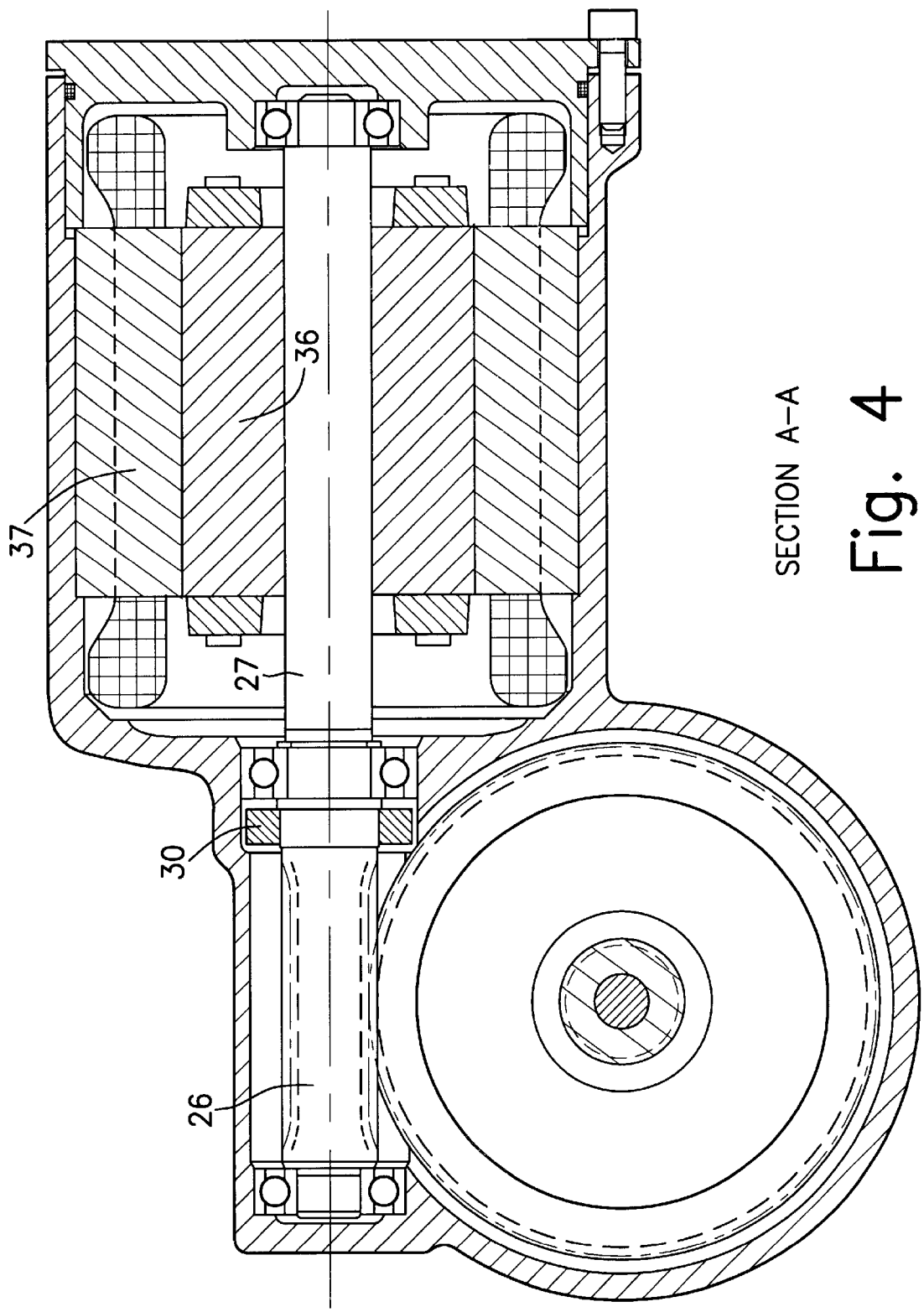
FIG. 4 is a cross-sectional view of an electric motor of the power steering system taken along the line A—A shown in FIG. 3.

An an alternative to the example embodiments illustrated in FIGS. 1 through 3, sensor unit 15 may be connected to pinion shaft 2 instead of input shaft 6. Magnet ring 16 and magnet 42 would then be arranged on input shaft 6. In this arrangement, the steering angle and/or the steering rate may be measured directly on input shaft 6. The torsional angle between input shaft 6 and pinion 3 does not affect the measurement result.

Magnet ring 16 or the corresponding bar magnet, magnet ring 30 magnet 42 may be replaced with other pulse generators such as, for example, a toothed gear or a rack. This has no effect on the function of the sensor system.

The important thing is that a single magnet ring is sufficient the operation of the power steering system. The parameters torque, steering rate, and steering acceleration may be detected with the embodiments illustrated in FIGS. 1 and 2. For greater steering comfort, for example, for improved return motion, the steering function may be extended with the detection of the absolute steering angle, for example, using gear 38 and additional magnet 42.

What is claimed is:

1. An electrically supported power steering system for a motor vehicle, comprising:
   an input shaft mechanically linked to a steering wheel of the motor vehicle, the input shaft being configured to transmit a steering torque to steer the wheels of the motor vehicle;

an output element mechanically linked to the wheels of the motor vehicle to be steered;

a torsionally flexible element connecting the input shaft and the output element, the torsionally flexible element providing a limited torsion movement between the input shaft and the output element;

a servomotor configured to apply a servo power to the output element; and a detection unit configured to contactlessly detect a direction and an intensity of the steering torque imparted on the input shaft and at least one steering-specific parameter, the detection unit including at least one sensor connected to one of the input shaft and the output element, the at least one steering-specific parameter including at least one of a torque, a steering rate and a steering acceleration;

wherein the detection unit includes a single pulse generator, the single pulse generator including a magnet ring, at least one of a peripheral surface and an end face of the magnet ring including alternating magnetic north and magnetic south poles so that a relative position between the input shaft and the output element and a change in position of the one of the input shaft and the output shaft are detectable by the at least one sensor.

2. The electrically supported power steering system according to claim 1, wherein the servomotor is configured to apply the servo power directly to the output element.

3. The electrically supported power steering system according to claim 1, wherein the servomotor is configured to apply the servo power indirectly to the output element.

4. The electrically supported power steering system according to claim 1, further comprising a stationary sensor housing and a flat spiral spring, the at least one sensor including a rotating part, the flat spiral spring electrically connecting the rotating part and the stationary sensor housing.

5. The electrically supported power steering system according to claim 1, further comprising a stationary sensor housing and a wiper unit, the at least one sensor including a rotating part, the wiper unit electrically connecting the rotating part and the stationary sensor housing.

6. The electrically supported power steering system according to claim 1, further comprising a gear arranged on the one of the output element and the input shaft, the gear configured to convert a plurality of revolutions of the input shaft into one of a small rotational movement and a small translational movement.

7. The electrically supported power steering system according to claim 6, further comprising a threaded nut and an axial guide, the axial guide being configured to guide the threaded nut axially and non-rotatably, the gear including a thread connected to the output element and the threaded nut.

8. The electrically supported power steering system according to claim 7, further comprising a magnet connected to the threaded nut, the magnet configured to generate a signal in accordance with an axial movement and in accordance with an absolute steering angle.

9. The electrically supported power steering system according to claim 7, further comprising:

a first magnetoresistive sensor configured to detect the at least one steering-specific parameter;

a second magnetoresistive sensor configured to detect an absolute steering angle; and a common electronic unit including a common circuit board, the first magnetoresistive sensor and the second magnetoresistive sensor being arranged on the common circuit board.

10. The electrically supported power steering system according to claim 1, wherein the servo motor includes an electric motor.

11. The electrically supported power steering system according to claim 10, wherein the at least one sensor of the detection unit is configured as a single unit, the at least one sensor being configured to detect the steering torque, a steering direction, a steering angle, an absolute steering angle, the steering rate, the steering acceleration and a rotor speed of the electric motor.

* * * * *

UNITED STATES PATENT AND TRADEMARK OFFICE
CERTIFICATE OF CORRECTION

PATENT NO. : 6,422,336 B1
DATED : July 23, 2002
INVENTOR(S) : Abele et al.

It is certified that error appears in the above-identified patent and that said Letters Patent is hereby corrected as shown below:

Column 2,
Line 56, after "effect" and before "such" insert -- , --;

Column 3,
Line 64, after "third" delete "embodiment" and insert -- example -- therefor;

Column 4,
Line 9, after "housing" delete "," and insert -- . -- therefor;
Line 50, after "30" insert -- and --; and
Line 54, after "sufficient" insert -- for --.

Signed and Sealed this

Eighteenth Day of February, 2003

JAMES E. ROGAN
*Director of the United States Patent and Trademark Office*